United States Patent [19]

Putman et al.

[11] Patent Number: 4,805,114

[45] Date of Patent: Feb. 14, 1989

[54] ECONOMICAL DISPATCHING ARRANGEMENT FOR A BOILER SYSTEM HAVING A COGENERATIVE CAPABILITY

[75] Inventors: Richard E. Putman, Penn Hills Twp., Allegheny Cty.; Thomas Allen, Glenshaw, both of Pa.

[73] Assignee: Westinghouse Electric Corp., Pittsburgh, Pa.

[21] Appl. No.: 40,406

[22] Filed: Apr. 20, 1987

[51] Int. Cl.[4] ........................ G06F 15/20; G06F 15/46

[52] U.S. Cl. ........................ 364/494; 60/39.3; 236/14; 364/505

[58] Field of Search ........................ 364/494, 495, 505; 60/39.3, 39.55, 39, 463; 290/7; 236/14

[56] References Cited

U.S. PATENT DOCUMENTS

| | | | |
|---|---|---|---|
| 4,160,362 | 7/1979 | Martens et al. | 60/39.3 |
| 4,403,293 | 9/1983 | Bradt et al. | 236/14 |
| 4,417,438 | 11/1983 | Cheng | 60/39.55 |
| 4,459,098 | 7/1984 | Turek et al. | 364/510 |
| 4,463,574 | 8/1984 | Spethmann et al. | 364/505 |
| 4,591,988 | 5/1986 | Kuma et al. | 364/510 |
| 4,593,365 | 6/1986 | Haley, Jr. et al. | 364/510 |
| 4,597,256 | 7/1986 | Hamill et al. | 60/39.3 |
| 4,604,714 | 8/1986 | Putmann et al. | 364/494 |
| 4,628,462 | 12/1986 | Putman | 364/494 |
| 4,680,927 | 7/1987 | Cheng | 60/39.3 |

OTHER PUBLICATIONS

Applied Statistics; vol. VI, No. 2; "Evolutionary Operation: A Method for Increasing Industrial Productivity"; pp. 3-23; G.E. Box.

*Primary Examiner*—Parshotam S. Lall
*Assistant Examiner*—Kevin J. Teska
*Attorney, Agent, or Firm*—G. E. Hawranko

[57] ABSTRACT

An economical despatching arrangement for despatching load and fuel assignments on a multi-boiler cogenerative type steam generating plant includes a logic arrangement of determining a present value of flow of each fuel to each boiler, a logic arrangement of determining a present value of the share of the steam load carried by each of the boilers, a logic arrangement for calculating an optimal next value for each of the load and fuel assignments, a logic arrangement for estimating a proportionate share value for one of the boilers and the fuel flow values for one of the fuels and a logic arrangement for implementing the optimal next values as a function of whether a manual or automatic mode of operation has been selected for the particular parameter.

14 Claims, 6 Drawing Sheets

ECONOMICAL DISPATCHING ARRANGEMENT FOR A BOILER SYSTEM HAVING A COGENERATIVE CAPABILITY

FIELD OF THE INVENTION

This invention relates to an arrangement for economically controlling the dispatching of load and fuel assignments for a boiler system. More particularly, this invention relates to such an economical dispatching arrangement which, by use of a Simplex, Self-Directing Evolutionary Operation typically referred to as a SSDEVOP, can be effectively utilized on a boiler system having at least one dual boiler configuration which is fueled by two alternate fuel sources to derive the most cost effective approach to achieving the desired steam output of the boiler system.

BACKGROUND OF THE INVENTION

As a basis of understanding the economical dispatch arrangement for a boiler system having a cogenerative capability, one must first understand the boiler system itself and the parameters under which it is operating. To aid in this understanding, reference is hereby made to U.S. Pat. No. 4,604,714 issued to R. E. Putman Jr. et al on Aug. 5, 1986 which is incorporated herein by reference. From this system, it is known that the ultimate goal is to obtain the targeted amount of steam from a two boiler configuration each boiler of which can be fired from one of two fuel sources, and to do so at the least total cost in terms of purchased fuel. According to this configuration, it is required that the economical dispatching arrangement monitor and act on a number of primary parameters such as: the relationship between the efficiency and the load for each of the fuels on each of the boilers; the present steam flows from and fuel flows to each of the boiler units; and the automatic/manual status of the fuel and boiler master load control loops. In addition, other data to be considered includes the prices for each of the fuels and the heating values associated with each.

One approach to handling a number of variables for a linear or a non-linear system such as the present system falls under, has been by use of the SSDEVOP system originally developed by G.E.P. Box for optimizing chemical process performance. This approach was presented in an article entitled: "Evolutionary Operation: A Method for Increasing Industrial Productivity," *Applied Statistics*, Vol. VI, No. 2, pp. 3–23.

According to this method, a set of variables which are typically three in number, are initially assigned a base set of feasible or actual values. The experimental design consists of a set of four tests which each contain a different combination of these variables perturbed about the base set. A perturbation value (delta) is assigned to each variable according to a predetermined pattern and the cost associated with each test is then calculated. The worst case values; that is, the ones having the highest cost associated therewith, are subtracted from twice the means of the three best case values with the final set of values becoming the new base set of variables from which the next calculation is taken. This process is repeated until no further improvement in the calculated response is detected.

Though this method has proven effective for certain applications, particularly where the number of perturbable variables is low, there are certain deficiencies with this method when it is applied to a process having a larger number of perturbable variables that must be considered before an accurate response can be achieved. For instance, with a larger number of perturbable variables, there is a significantly longer time required for the process to converge on the optimum values for the variables. Additionally, the way this method has been used in the past has been to manually disturb the process to generate the desired test cases, a step which has the effect of unnecessarily disturbing the process. It has also been found that, because of the time deficiency when using a larger number of variables and the need to manually disturb the process, this method suffers in an application which does not involve a steady state process. This is true since, in a non-steady state process, the optimum process operating point can vary over a greater range than that of a steady state process and this method is only accurate where this point does not vary in any appreciable manner, as can be appreciated by the fact that this method is attempting to converge on a particular set of assignments for the variables. It has also been found with this method that when the variables are close to or at the operating constraints of the process, the accuracy is sacrificed.

SUMMARY OF THE INVENTION

It is therefore an object of the invention to provide an economical despatching arrangement for use on a cogenerative type dual boiler system which can determine the optimum cost effectiveness of a set of perturbable variables that relate to such parameters as the load versus efficiency of each boiler, the enthalpy rise in each boiler, and the cost and heating value of each fuel used to fire each boiler.

In accordance with the principles of the present invention, there is provided an economical despatching arrangement for despatching load and fuel assignments for a steam generating plant having a multi-boiler configuration in which each boiler can be fired by at least two fuels. This economical despatching arrangement includes a means for determining a present value of flow for each of the fuels, a means for determining a present value of steam load carried by each boiler, and a means for calculating an optimal next value for each of the load and fuel assignments as a function of the present fuel flow values and present plant steam demand. The calculating means includes a means for estimating a proportionate share value for one of the boilers and the fuel flow values for one of the fuel types which thereby reduces the number of variables on which the calculating means must act in order to arrive at the optimal next values for the load and fuel assignments. The economical despatching arrangement also includes a means for implementing the optimal next values into the boiler master control logic under certain conditions including whether a manual or automatic mode of operation has been selected for the particular operating parameter.

The economical despatching arrangement can also include a means for converting the various heating constants associated with each of the fuel types to a single standard so that the calculating means can place equal weighting on these variables to determine the optimal values for the load and fuel assignments.

DESCRIPTION AND OPERATION

Figure 1:
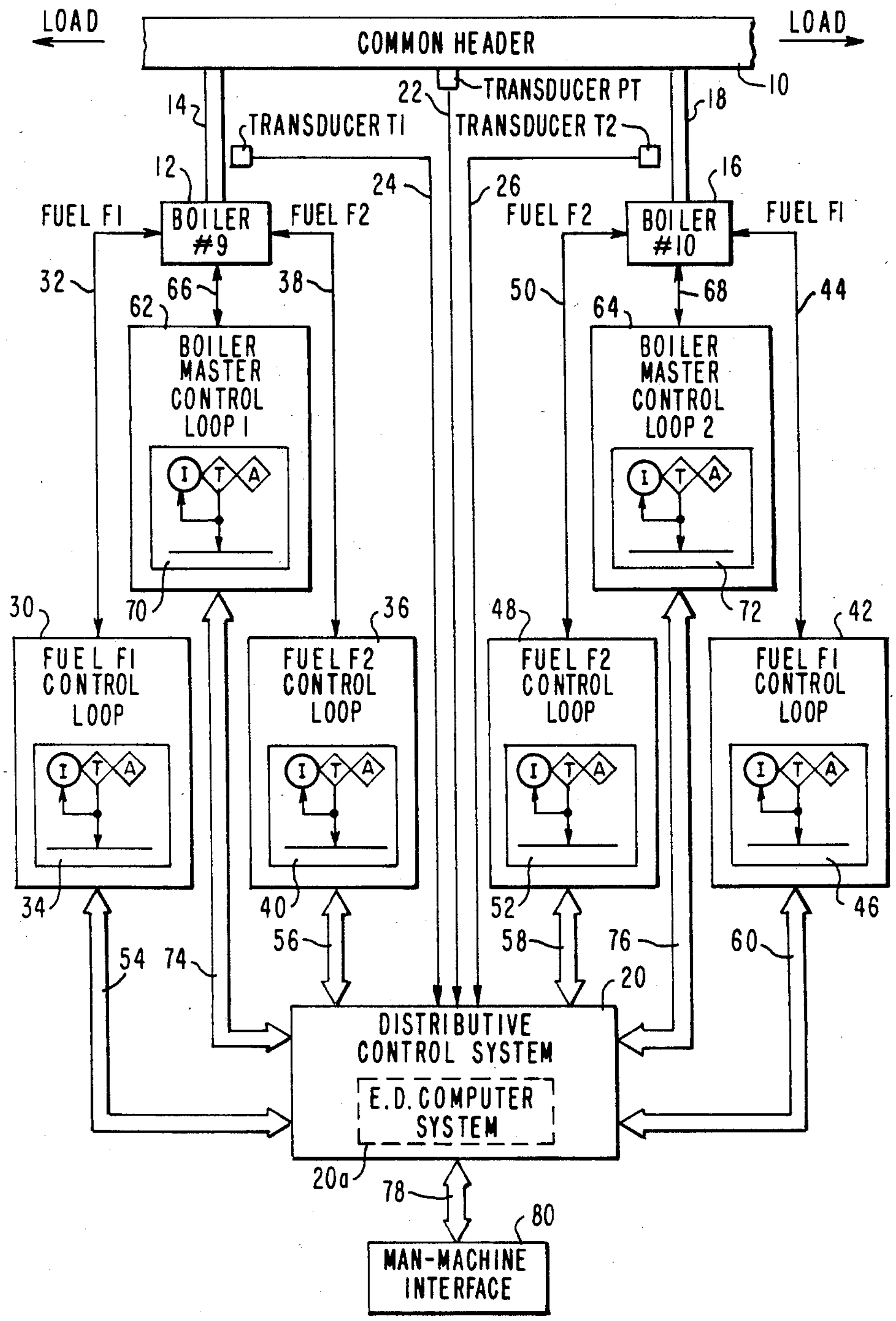
FIG. 1 is a functional block diagram of a cogenerative boiler system for which the present invention is applicable.

As seen in FIG. 1, a steam generating plant typically used as a source of steam for an electric power generating facility using a turbogenerator arrangement employs a common header 10 from which the steam load is provided to the turbogenerator (not shown). It will be noted that generally, such a steam generating plant is controlled by means of a complex distributive processing system which is made up of a number of separate processing units each designed to control a particular aspect of the operations of the plant. For purposes of this disclosure, FIG. 1 is illustrated having a distributive control system, designated reference 20, which is effective in a manner to be later discussed, in order to control a dual boiler configuration which is fired by a two fuel arrangement; additionally, the distributive control system 20 has associated therewith, a computer system 20*a* which operates the economical despatching arrangement that is the subject of this invention. It can be appreciated however, that the economical dispatching arrangement disclosed herein can be utilized with other multiple boiler/fuel configurations as well.

A first boiler 12 feeds steam to the common header 10 over steam line 14 while a second boiler 16 feeds steam to the common header 10 over another steam line 18. It is generally accepted that the goal of any steam generating facility is to provide the total steam load needed by the turbogenerator (not shown) to the common header 10 at the least overall cost. Therefore, in order to first verify that the proper amount of steam is being generated, a pressure transducer PT is disposed adjacent the common header 10 and the measured pressure value present in the common header 10 is communicated to the computer system 20 over a signal line 22. The distributive control system 20 will include a control module (not shown) for controlling the boiler header pressure. The output of this controller is fed to the respective fuel control loops in conjunction with the feedwater controllers (not shown) to adjust the load on the boilers and maintain the header pressure at the setpoint value.

The amount of steam pressure in the steam line 14 from the first boiler 12 is sensed by a first transducer T1 which is disposed adjacent the steam line 14. The first transducer T1 communicates this value to the computer system 20 over signal line 24. A second transducer T2, disposed adjacent the steam line 18 leading from the second boiler 16, senses the amount of steam pressure being supplied by the second boiler 16 and communicates this information to the computer system 20 over a signal line 26.

As further seen in FIG. 1, each of the boilers 12 and 16 has connected thereto, a separate fuel control loop for each of the two fuels which are used to fire the boilers 12 and 16. A first fuel control loop 30 is connected to the first boiler 12 and is effective for supplying a specific amount of fuel to the first boiler 12 in accordance with the requirements of the economical despatching arrangement. A bi-directional link 32, connected between the first boiler 12 and the first fuel control loop 30, is intended to be illustrational of the fact that, in addition to control signals and status indications being communicated thereover, the actual fuel delivery occurs here as well; additionally, it should be noted that such delivery and communication operations can be achieved in the conventional manner.

Shown disposed within the first fuel control loop 30, is a manual/automatic transfer control element 34, hereinafter referred to as the first transfer element 34. The first transfer element 34 is a conventional process control device and is effective for insuring a smooth transition when transferring from a manual to an automatic mode of operation or vice-versa and further, for providing an indication of such transfer to the computer system 20. The interfacing of the status of the first transfer element 34 to the economical despatching arrangement will be discussed hereinafter in further detail.

Also connected to the first boiler 12 is a second fuel control loop 36 which is connected, similarly to the first fuel control loop 30, by means of a bi-directional link 38. The second fuel control loop 36 controls the flow of a second fuel to the first boiler 12 in the same manner as the first control loop 30 controls the flow of the first fuel and, as such, employs a second manual/automatic transfer element 40 to insure a smooth transition between the manual and automatic modes of operation and to indicate the occurrence of such transition to the computer system 20. It should be noted at this time that the two fuels for which the first and second fuel control loops 30 and 36 are effective can be for instance, gas and oil.

At this time it is sufficient to state that the relationship of the two fuels supplied by the first and second fuel control loops 30 and 36 is such that a ratio between the BTUs supplied by the gas to the total BTUs supplied by both fuels is determined and utilized by the economical despatching arrangement in a manner to be later discussed. It can be appreciated that at certain times it will be required to remove the control of the ratio of the gas and oil flows from the control of the economical despatching arrangement as for instance at times when the flue gas sulphur content of the steam plant must be maintained to a certain level and this can only be done under a specific fuel flow ratio established by the computer system 20 independent of economic considerations. In this situation, the first and second transfer elements 34 and 40 will be in the manual mode of operation and the computer system 20 will calculate the fuel ratio to be implemented.

Similar to the dual fuel supply arrangement for the first boiler 12, the second boiler 16 is supplied with two fuels over a third and a fourth fuel control loop 42 and 48. The third fuel control loop 42 supplies the same type of fuel to the second boiler 16 as does the first fuel control loop 30 to the first boiler 12; additionally, the fourth fuel control loop 48 supplies the same type of fuel to the second boiler as does the second fuel control loop 36 to the first boiler 12.

The third fuel control loop 42 is connected to the second boiler 16 over the communication link 44 which represents that control and indication signals are transferred thereover as well as the actual delivery of the fuel. Also similar to the first and second fuel control loops 30 and 36, the third control loop 42 includes an automatic/manual transfer control element 46 which serves the identical purpose of insuring a smooth transition between the two modes of operation as well as indicating the same to the computer system 20. The fourth fuel control loop 48 is connected to the second boiler 16 over a communication link 50 and contains a transfer element 52 in the same manner as the previously discussed first through third fuel control loops.

Each of the four fuel control loops 30, 32, 42, and 48 is in signal communication with the computer system 20 over respective first through fourth fuel communication lines 54, 56, 58 and 60 which represent the fact that control signals as well as measured data is transferred thereover. It can be appreciated that, in a process control system such as can be used in a steam generating plant for an electric utility, the most effective manner of communicating such information is by way of some type of shared data bus configuration on which a number of distributive processing elements are disposed. This is a technique known in the art and the present invention is intended to be operative with this configuration.

As also seen in FIG. 1, the steam generating plant includes respective first and second combustion control loops 62 and 64 which are connected to the respective first and second boilers 12 and 16 over communication lines 66 and 68. The communication lines 66 and 68 connected between the boilers and the combustion control loops are bi-directional links and are effective for transferring information thereover relating to the proportionate shares of the steam load that each of the boilers are carrying, such information including the calibrated master control signals to each of the boilers and the heat acquired measurements. Each of the first and second combustion control loops 62 and 64 have disposed therein, automatic/manual transfer control elements 70 and 72 which allow for a smooth transfer between the two modes of operation and which provide the ability to override the determination of the economical despatching arrangement in assigning the share of the steam load to be carried by the first and second boilers 12 and 16 and to set the proportionate shares manually based on considerations other than cost.

The first and second boiler master control loops 62 and 64 are connected to the distributive control system 20 over respective first and second communication links 74 and 76. The communication links 74 and 76 are shown as bi-directional elements and are intended to be representative of the fact that this communication path is most likely accomplished by means of a data bus configuration.

Connected as another input/output device to the computer system 20 over a bi-directional communication link 78, is a man-machine interface 80. The man-machine interface 80 provides the operator the ability to monitor the operating conditions of the steam generating plant and to manually make adjustments if necessary; the interface 80 most likely being accomplished by means of a video terminal and keyboard configuration. In addition, the optimal set of fuel and load assignments determined by the economical despatching arrangement may be presented to the operator in the form of suggestions rather than being passed as setpoints to the associated combustion and fuel control loops.

Figure 4:
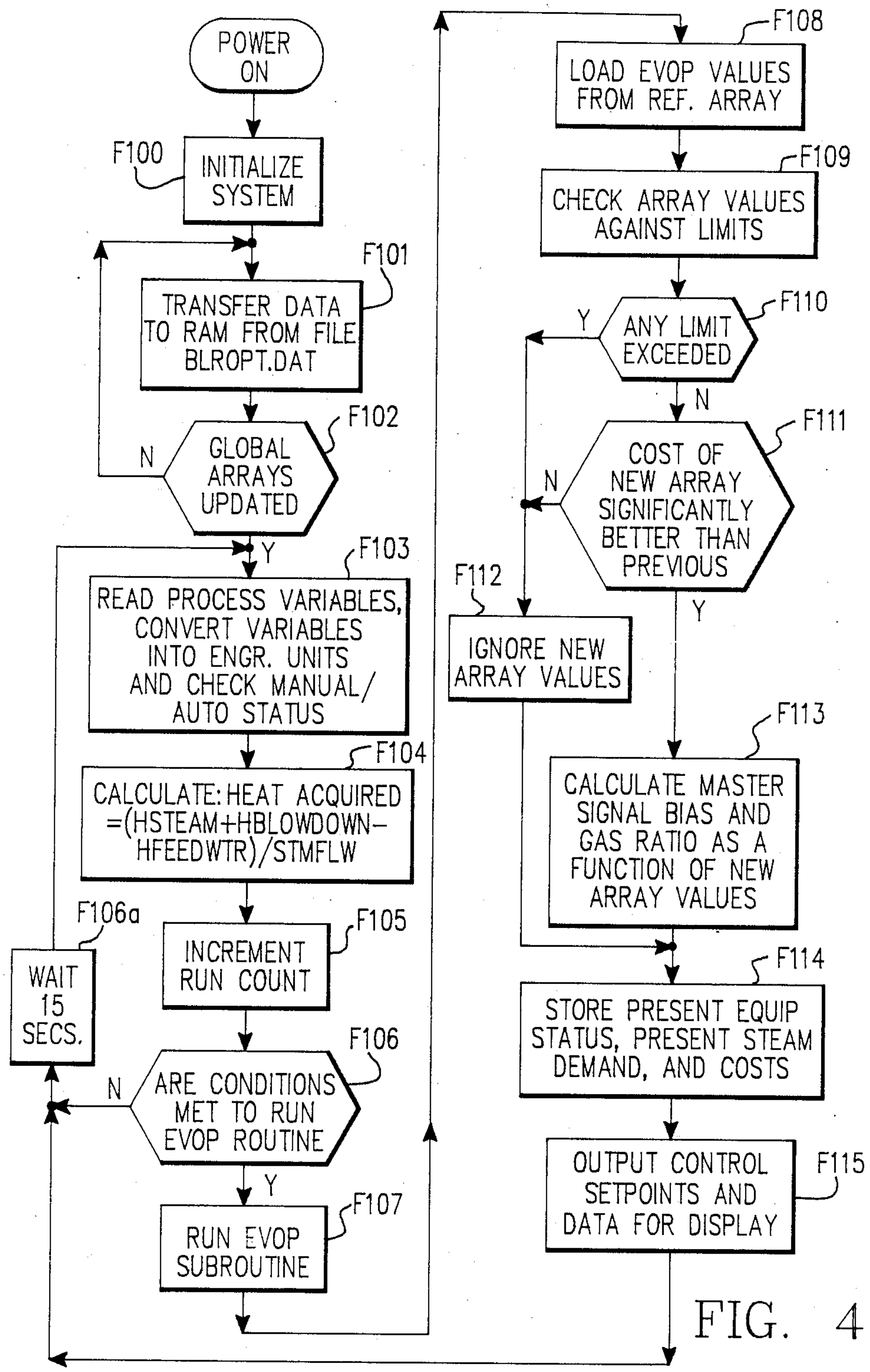
FIG. 4 is a functional block diagram of the main instruction loop of an economical despatching arrangement constructed in accordance with the present invention.

It should be understood that the operation of the economical despatching arrangement is dependent on the interrelationship of the six control loops just discussed and that this interrelationship is monitored and controlled as a function of a specific set of instructions which are resident within the main instruction loop to be discussed relative to FIG. 4. As such, it should be sufficient at this point to state that the ratios of the fuels supplied to the specific boilers and the ratio of the loads carried between the two boilers are all factors to be considered in determining the most cost efficient use of the boilers and available fuels to achieve the desired total steam load.

The optimal values for the fuel and load assignments can be considered as six variables with one variable being associated with each of the previously discussed six control loops; these six variables are: the load carried by boiler 1, hereinafter called BLR1; the load carried by boiler 2 (BLR2); the percentage of the total fuel supplied by the first fuel to the first boiler (FL1-1); the percentage of the total fuel supplied by the second fuel to the first boiler (FL2-1); the percentage of the total fuel supplied by the first fuel to the second boiler (FL1-2); and the percentage of the total fuel supplied by the second fuel to the second boiler (FL2-2).

Figure 2:
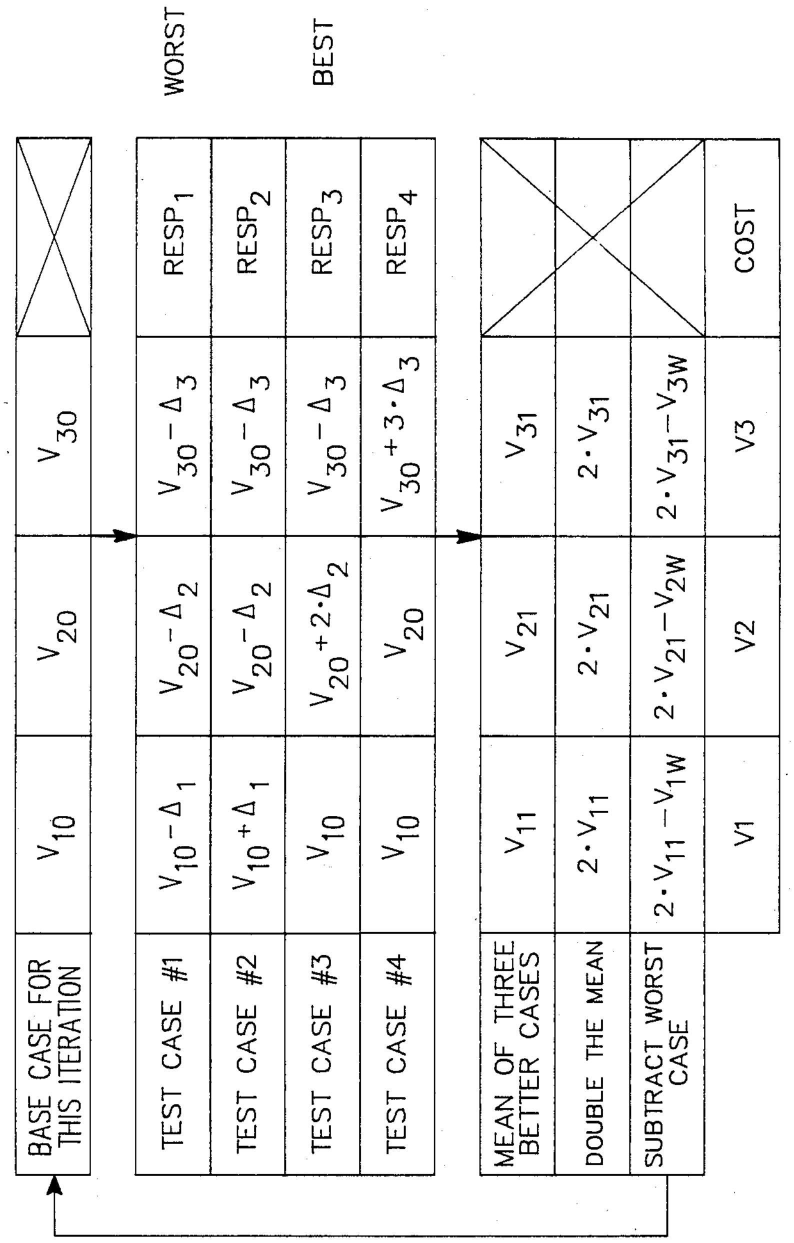
FIG. 2 is a tabulation of variables using the standard EVOP process.

In determining the optimal values for the fuel and load assignments for a steam generating plant, the economical despatching arrangement that is the subject of the present invention, utilizes an enhanced version of the SSEVOP method developed by G.E.D. Box. The SSEVOP method is illustrated in FIG. 2 wherein the process is shown as having basically, a three step approach. The first row, designated RW1, is illustrated as having three variables V10, V20, and V30 which constitute the base case for the iteration of the process, these three values representing feasible or actual values that the variables can assume.

The SSEVOP experimental design consists of a set of four tests each containing a different combination of the three base variables V10, V20, and V30 which are perturbed about the base set. A perturbation value (delta) is assigned to each variable and the central tabular portion of FIG. 2 consisting of rows RW2-RW5 shows the pattern in which the base values are modified to provide the four different tests used in the search. It will be noted that in tests #3 and #4, shown in rows RW4 and RW5, the base values of variables V10 and V20 are actually used unchanged. It will also be seen from FIG. 2 that, while the perturbation multiplier (delta) is usually unity, certain elements have multipliers greater than unity. The sequence developed by the SSEVOP principle is that variable V10 in test #2 has a multiplier of unity; variable V20 in test #3 has a multiplier of 2 and, variable V30 in test #4 has a multiplier of 3. The effect of this pattern is that, for each of the variables V10, V20, and V30, the sum of the perturbations over all four tests is zero.

The last, or fourth column CL4 of the second grouping of rows in FIG. 2 is occupied by the response values calculated according to the variables V10, V20, and V30 and the perturbations thereto. Since the present application of the SSEVOP process is one to determine the most economical despatching arrangement for the load and fuel assignments for a steam generating plant, the response values in column CL4 are cost values. Each response is calculated and stored and then by a simple comparison method, the best and worst test response can be identified, the best response being the most cost effective and the worst response being the most expensive one.

Using the means of the three better test results, variables V11, V21, and V31 are now calculated. The third grouping of rows shown in FIG. 2 as including rows RW6 through RW9 illustrates that the worst case values are subtracted from twice the mean of the three better test results. This final set of values now becomes variables V10, V20, and V30 forming the new base case from which the procedure is repeated and new perturbed test results are evaluated until no further improvement in the calculated response is detected.

Since it is imperative that the equipment not be run outside its operating constraints, it is necessary to insure that the perturbed values for each test set all fall within upper and lower constraints assigned to each of the variables. Furthermore, to insure that the convergence to the desired result occurs within a reasonable time period, the magnitude of the perturbation should be decreased in a finite number of discrete steps and the operation should be performed on a small number of variables as for instance, the three variables on which this example has been conducted.

In addition to the problem of limiting the number of variables to a small number, the SSEVOP experimental design shown in FIG. 2 also suffers in that, in order to obtain the first base set of variables, the process must be interrupted to measure these quantities, which has the effect of unnecessarily disturbing the process. Furthermore, the process of FIG. 2 also does not work well when the variables are at or close to the operating constraints of the system, nor does this process work well in non-steady state applications; that is, in situations where the process operating point can vary by more than a small amount.

Figure 3:
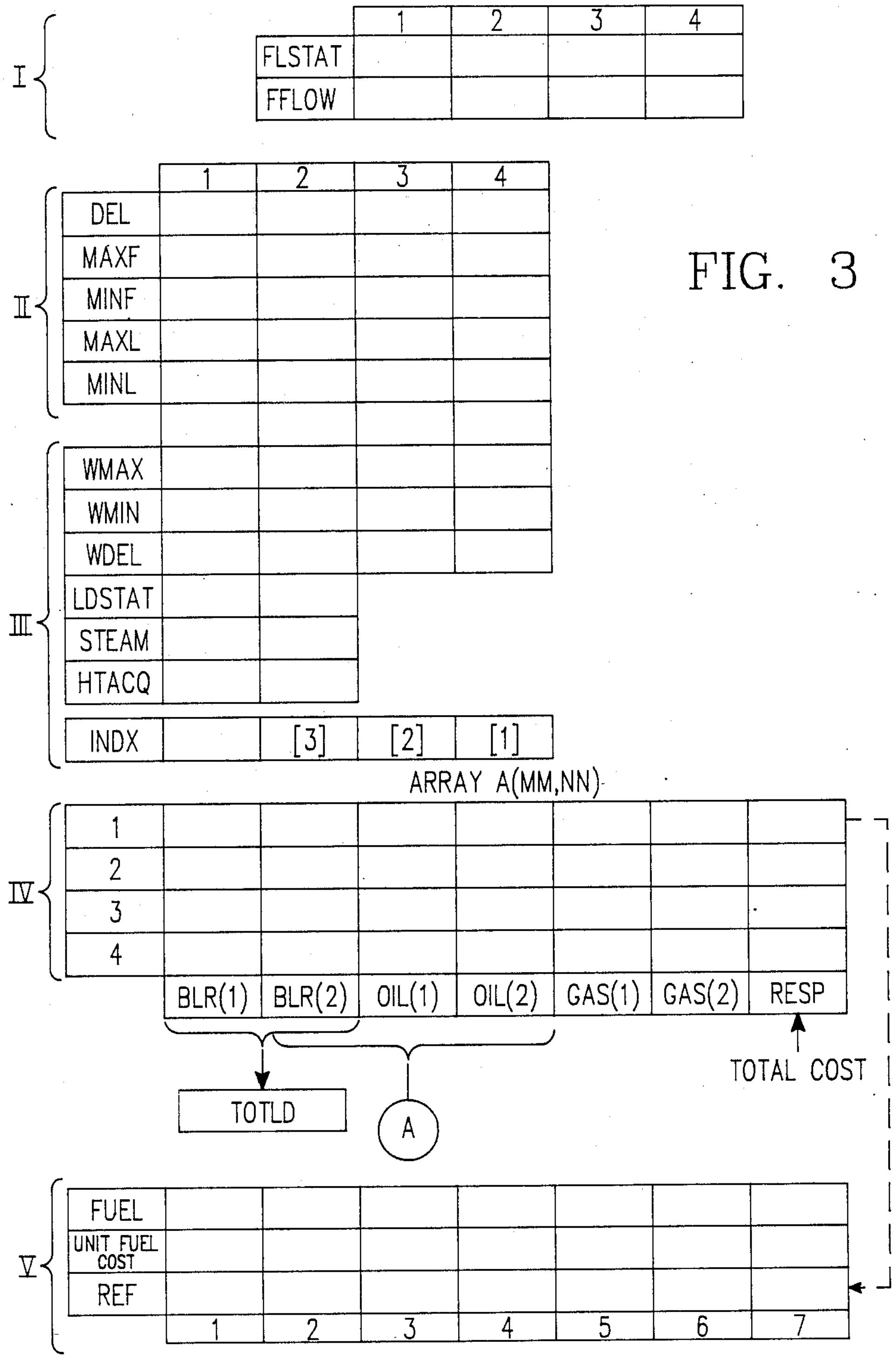
FIG. 3 is a tabulation of variables using an enhanced EVOP process in accordance with the present invention.

As a result of these limitations to the SSEVOP experimental design shown in FIG. 2, the enhanced evolutionary operating system for use on a dual boiler, cogenerative type steam generating plant is disclosed herein and is illustrated in tabular form, in FIG. 3 where it can be observed that the data necessary to perform an EVOP operation is all interrelated and will occupy positions within the shown tabular arrangement in one of five segments having row designations to indicate the type of data and column indications which are aligned in relation to the six variables and the responses calculated therefrom.

The first data segment, shown in FIG. 3 as segment I, contains information relating to the flow of the two fuels to the respective first and second boilers 12 and 16 and as such, is four columns wide. These four columns are designated COL 3 through COL 6 and correspond to the fuel columns associated with segment IV which will be discussed in relation to the actual response calculations. Segment I includes two rows designated ROW 1 and ROW 2 which indicate respectively, the status of fuel flow (FLSTAT); that is, whether the valves (not shown) in the particular fuel control loop are open so that fuel can be supplied therethrough, and the actual fuel flow (FFLOW).

The information shown in data segment II of FIG. 3 relates to the operating parameters of the boilers and the fuels. In row 1 of data segment II, DEL signifies the values for the perturbations (delta) to be introduced to the base values. Rows 2 and 3 of data segment II are labeled MAXF and MINF and signify respectively, the maximum and minimum allowable flows of fuel to each boiler. Rows 4 and 5 of data segment II are labeled MAXL and MINL and signify respectively, the maximum and minimum allowable loads for each of the boilers. It should be noted that the values for the information contained in rows 2 through 5 of data segment II are determined by the operating constraints of the physical plant itself and that, should these constraints change, as for instance, if the number of burners in operation would change, these maximum and minimum values would have to be altered accordingly. It should also be noted that data segment II, though only four columns wide, allows for the determination of the designated information for all six variables since the remaining two columns relate to the second fuel for which the appropriate values can be determined based of the known values of the first fuel and the known relationship between the two fuels.

The information contained in data segment III, unlike that contained in data segment II which is related to the physical constraints of the plant and will not change unless the plant configuration changes, is related to the internal structure of the EVOP process and as such, will vary according to the point within the process that is being carried out at the particular time. The information contained in rows 1 through 3 of data segment III are labeled WMAX, WMIN, and WDEL and signify respectively, the maximum working value of an associated column variable, the minimum working value of an associated column variable, and the working value for the perturbation factor (delta) which is made initially equal to $DEL_i$ and is subsequently reduced in finite steps to achieve the optimal solution in the shortest amount of time. It will be noted that rows 1 through 3 of data segment III are four columns wide since the information for the other two columns can be derived from the information in the shown four columns and need not be given a dedicated position in this data segment III.

As further shown in FIG. 3, the information contained in rows 4 through 6 of data segment III is labeled LDSTAT, STEAM, and HTACQ which signify respectively, whether each boiler master is in a manual or an automatic mode; in other words, the status of each boiler, the steam flow in each boiler, and the heat acquired per lb. of main steam produced in each boiler. It will be noted that rows 3 through 6 of the data segment III are only two columns wide since this information pertains to the two boilers steam loads only. Occupying row 7 of the data segment III, is information pertaining to the indexing of the various program arrays relating to the perturbation values.

The INDX row of the data segment III is shown as having information in columns 2 through 4 only, this arrangement comes about as a result of the reduction in the number of variables which must be perturbed to achieve the optimal load and fuel assignments, a reduction which will be now discussed relative to data segment IV which is the segment signifying the operation of the EVOP process. As seen in FIG. 3, data segment IV includes 4 rows which are labeled 1 through 4 and which represent the four test cases that the EVOP process performs in order to achieve the next set of base values. In this respect, the operation performed in the data segment IV is essentially the same as that performed as shown in FIG. 2. However, unlike the EVOP arrangement shown in FIG. 2, data segment IV of FIG. 3 requires the operation of this process on a total of 6 variables which are designated BLR(1), BLR(2), OIL(1), OIL(2), GAS(1), and GAS(2) and which correspond to the six data columns of data segment IV.

The enhanced EVOP process of the present invention calculates the optimal values for the load and fuel assignments by perturbing only three variables and using mathematical models to derive the remaining three shadow variables. The three variables which are perturbed are indicated by the horizontally disposed brackets shown enclosing the second through fourth columns of data segment IV and which is designated bracket A. The second boiler load variable BLR(2) is one of the perturbed variables and it can be appreciated that the other boiler load variable BLR(1) can be derived by the relationship:

$$BLR(1)=TOTLD-BLR(2) \quad Eq.(1)$$

where the initial sum of the boiler loads becomes the target value TOTLD.

The optimal assignment for each of the fuel values to each of the boilers can also be calculated based on deriving the optimal values for only one of the types of fuel since the boiler load and heat acquired per lb. are known for each test case. Having derived one optimal fuel flow assignment by the EVOP process, the other fuel flow can be determined by the relationship:

$$FUEL2FL=HACQ\times STMFL-FUEL1FL\times HVFUEL1\times EFFUEL1 \quad Eq.(2)$$

where,

FUEL1FL=perturbed fuel flow;

HVFUEL1=heating value of the perturbed fuel flow;

EFFUEL1=efficiency of the perturbed fuel at steam load STMFL; and

FUEL2FL=calculated flow of shadow fuel.

This operation of deriving the second fuel flow value based on the perturbed first fuel flow value and Eq.(2) must be repeated for the second boiler to achieve the optimal assignment for its second fuel as well. In order to perform the above calculations, the values for heating values of the particular fuels must be known. The individual fuel efficiency at different steam loads is calculated and regressed periodically to produce current efficiency versus load curves for each fuel on each boiler.

In performing the EVOP process on this array of information, the first row of data segment IV is initialized with the present values of the boiler steam loads and the perturbable fuel flows. A starting cost is calculated using the present fuel flows and the four test cases are run in the same manner as shown relative to FIG. 2. For each test case the shadow variables are calculated and the total cost associated with each test case is estimated.

The optimal assignments obtained from the execution of the EVOP experimental design are stored in the third row of the data segment V which has been designated REF. The data segment V includes a first and a second row which are labeled, respectively FUEL and Unit Fuel Cost and which represent the calculations performed by the EVOP process for obtaining the optimal fuel and load assignments which yield the best cost results, these calculations being performed in the normal manner.

The operation of the economical despatching arrangement for a dual boiler, cogenerative type steam generating plant will now be described with particular reference to the main instruction loop illustrated in FIG. 4 and the flowchart for the enhanced EVOP subroutine shown in FIGS. 5A and 5B.

As seen in FIG. 4, upon initially turning the entire system on or when the system has been restarted, there is an initialize system instruction, F100, that is effective for resetting all hardware and program locations to an initial state. After initialization, the main instruction loop executes a transfer of a data instruction, F101, for a file entitled BLROPT.DAT from a disk storage medium to reserved arrays of RAM where the information can be more rapidly accessed. A table illustrating the contents of this file is found in the attached Appendix A. Upon the completed transfer of the data to the RAM locations, an integer global location is set to 1 to indicate that the updating is complete which indicates as well that the global arrays of data are valid. An instruction, F102, verifies that the integer global location is set to 1 before proceeding to the next instruction; if this integer is 0, the RAM locations have not been updated and the main instruction loop returns to the transfer instruction, F101, and the online optimization is prevented from running.

A conversion instruction, illustrated as reference F103, insures that the fuel, steam, and feedwater flows are given the same weighting by the EVOP subroutine by converting these constants to equivalent units. For steam, feedwater and oil, these units must be lb./hr and for gas the unit of measure must be scf/hr. This conversion instruction also insures that status of the automatic/manual transfer elements are designated as 1=auto and 0=manual and that this information is available for use by the EVOP subroutine.

The main instruction loop then calculates the heat acquired per lb. of main steam produced in each boiler by the equation shown in instruction F104 where the variables contained therein are measures of the enthalpies of the main steam, the blowdown steam and the feedwater and are values determinable by conventional means. Additionally, the variable STMFLW is a measure of the main steam flow and is also determinable by conventional means. The resultant calculated value for the heat acquired per lb. of steam will be utilized in the EVOP subroutine for determining the shadow fuel flows.

After calculating the heat acquired, the main instruction loop executes an instruction that increments a counter, F105, which counter stores the number of runs of the main instruction loop until such time as a predetermined number of runs has occurred and the EVOP subroutine can be run again. The count stored in instruction F105 is utilized in the next instruction, F106, where, in addition to the count acting as a determination of when to run the EVOP subroutine, other information is considered as well. The EVOP subroutine will also be run if there has been a change in the equipment status since the last run or if the change in the steam load exceeds a predetermined value. If any of the above conditions are met, instruction F106 proceeds to an execution of the EVOP subroutine, F107; if none of these conditions is met, instruction F106 returns through delay instruction **F106*a*, to instruction F103**. For purposes of illustration, the present invention utilizes a run count whereby, if at least one minute has elapsed since the last time the EVOP subroutine was executed and a significant change has occurred in the total steam demand, or in the auto/manual status of the combustion or fuel control loops, or in the boiler in/out service status, or in the burner status, the EVOP subroutine will be run; however, if none of these conditions has been met, the EVOP subroutine will only be run every 5 minutes. It can be appreciated that these timing requirements are recommendations only and that they come about due to the intrinsically slow response of the boilers and the desire to keep the duty cycle down, additionally, other timing constraints can be set without departing from the scope of the present invention.

Figure 5A:
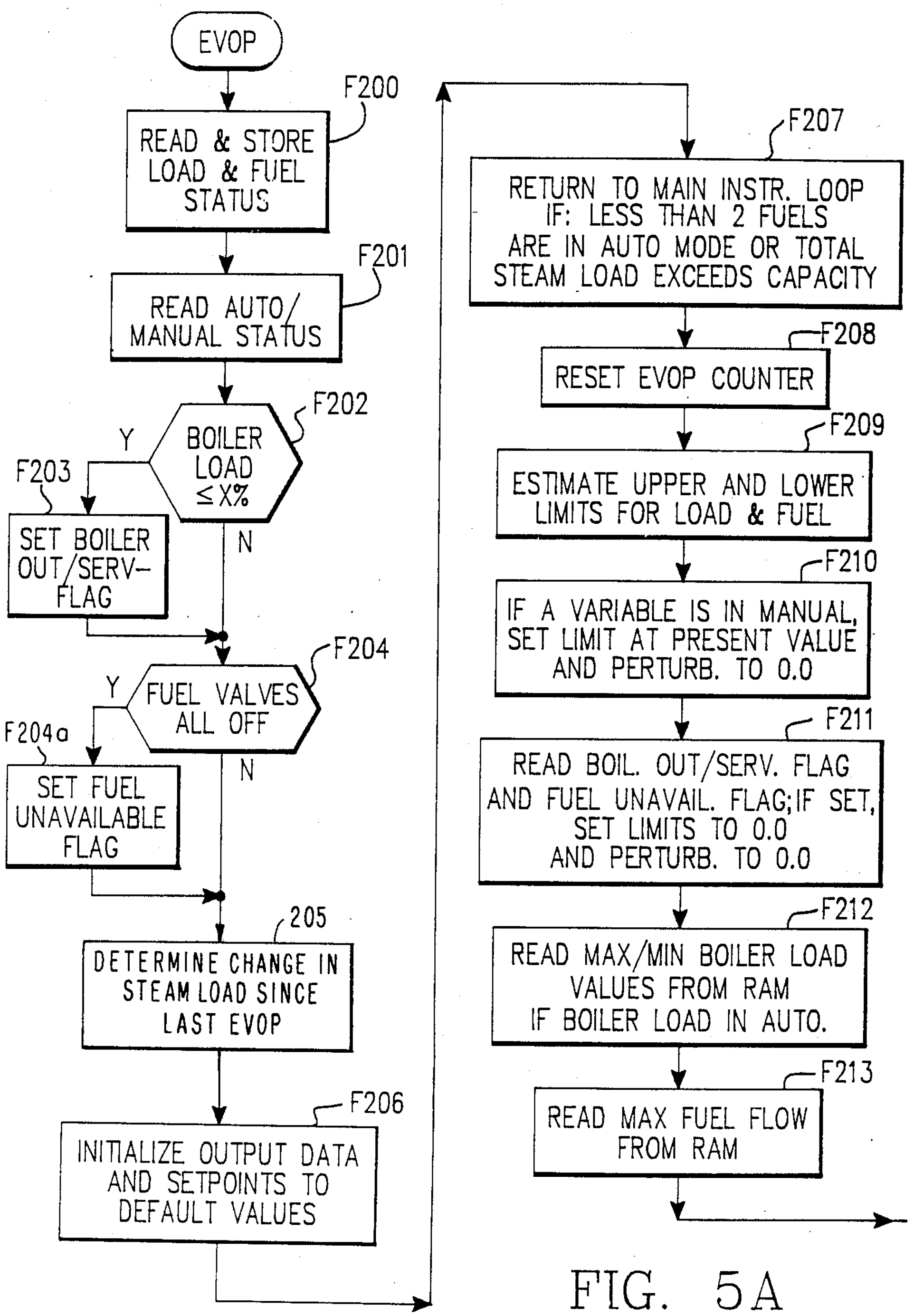
FIGS. 5A and 5B are functional block diagrams of the flow chart for the enhanced EVOP subroutine shown in FIG. 4.
Figure 5B:
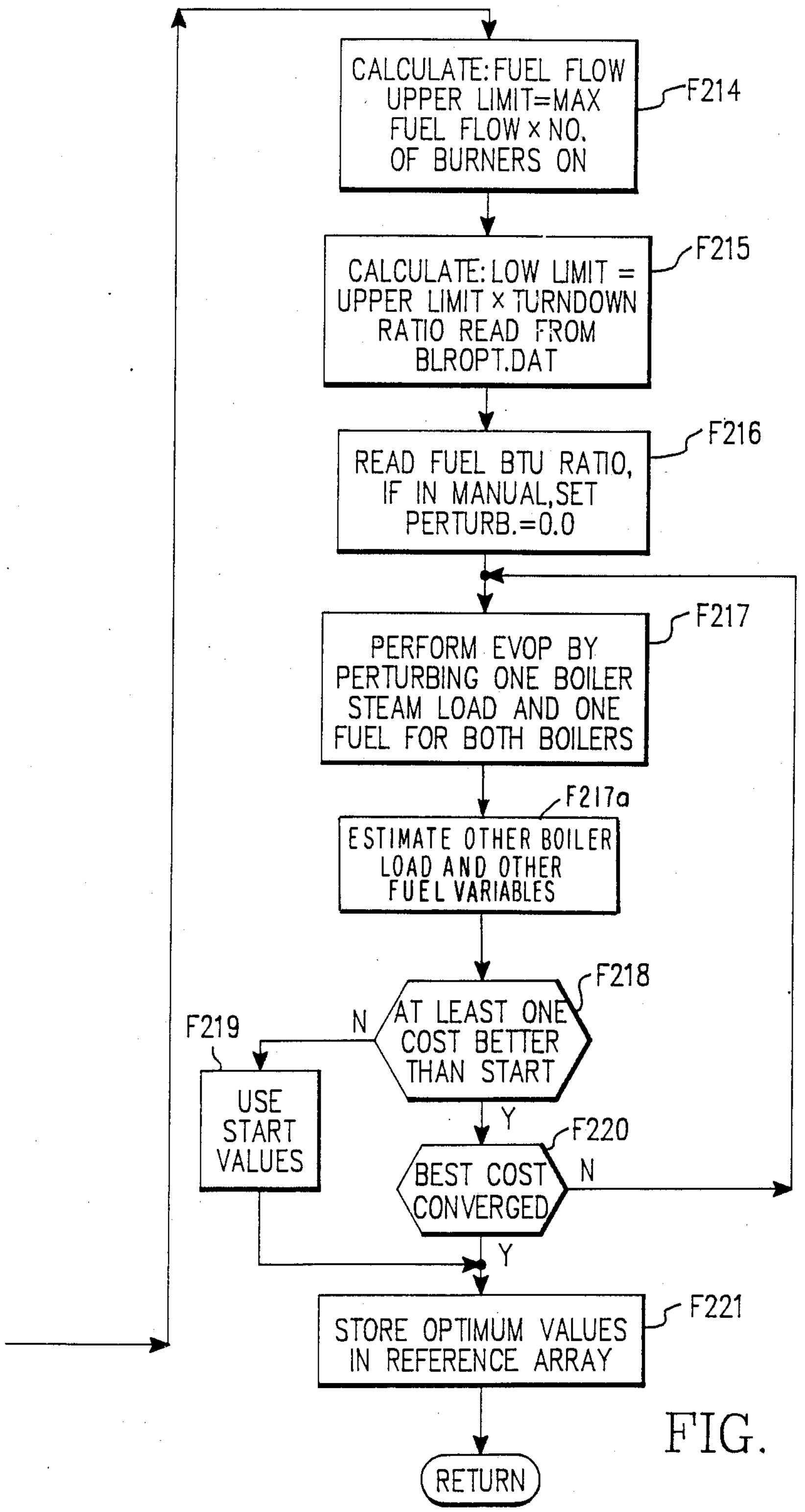

Once the EVOP subroutine has been run, the detailed discussion of which will made with respect to FIGS. 5A and 5B, the values from the REF array, or the third row of data segment V shown in FIG. 3, are checked against relevant upper and lower constraints to insure validity of the experiment, this operation being shown as instructions F108 and F109. Since the EVOP procedure is not a mathematically exact procedure and since the optimization within all of the constraints of all the variables may not always be possible, an instruction, F110, verifies that if any of the limits have been exceeded, the main instruction loop will ignore the load and fuel assignments calculated by the EVOP procedure and will reuse the previous values which have been stored in the event that the EVOP results were unacceptable. Additionally, unless the results of the EVOP procedure yield significantly improved cost effective load and fuel assignments, the main instruction loop includes an instruction, F111, which also provides that the calculated results will be ignored, F112, and the previous load and fuel assignments will be reused instead. In this manner, instruction F111 insures that a disturbance to the present operating point will not be introduced unless there is a meaningful cost improvement associated with the new load and fuel assignments.

If the response to the inquiry in instruction F111 is positive, that is, if the new array of load and fuel assignments provides a significant cost advantage over the previous array, the main instruction loop proceeds to an instruction for calculating the master signal bias and the gas ratio as a function of the new array values, this calculation being illustrated in instruction F113. The load distribution between the boilers is obtained by calculating the master bias signal to be applied to each of the boiler master signals in the control loops for the boilers. The master bias signal is derived by the relationship:

$$MSBIAS = HDIFF/MSTCAL \qquad \text{Eq. (3)}$$

where,

MSBIAS = the master bias about the mean boiler load;

HDIFF = the difference in the desired heat input to the boilers; and,

MSTCAL = the change in heat input for a 1% change in the boiler master signal.

The value for the variable HDIFF can be calculated from the following relationship and by the use of the new array of load and fuel assignments with the assumption that a positive difference occurs when boiler 10 leads boiler 9:

$$HDIFF = (HTIN10 - HTIN09) / 2.0 \qquad \text{Eq. (4)}$$

where, $HTIN09 = (FGAS09 \times HVGAS + FOIL09 \times HVOIL)/1.0E+6$; and $HTIN10 = (FGAS10 \times HVGAS + FOIL10 \times HVOIL)/1.0E+6$.

It will be noted that the values for the fuel flows used in the above two equations for determining the heat in values for the boilers are those values obtained from the EVOP procedure and further, that the heating values are known values. The computer system 20 can also contain an instruction (not shown) for calibrating the master controller output in terms of the heat input which can be achieved by conventional means.

Instruction F113 also includes provisions for calculating the fuel ratio for each boiler based on the ratio of gas to the total BTUs and the following relationship:

$$GASRAT = (FGAS \times HVGAS) / BTUIN \qquad \text{Eq. (5)}$$

where,

GASRAT is the gas/total BTU ratio;

BTUIN is the total BTU input to the boiler and is derived by:

$$BTUIN = (FGAS \times HVGAS)\ (FOIL \times HVOIL) \qquad \text{Eq. (6)}$$

and further where,

FGAS is the new gas flow assignment; and FOIL is the new oil flow assignment.

Once the above calculations have been completed, these new values become the present values which are stored in instruction F114 for use in future runs of the EVOP subroutine. Upon completion of the storing instruction, F114, the main instruction loop executes an instruction, F115, which outputs the control setpoints and data for display on the man-machine interface 80 where the system operator can monitor and act on these values according to the operating constraints of the system at that time. The main instruction loop, following execution of the conversion and display instruction, F115, will return to the start of the operation which corresponds to the execution of instruction F103.

As seen in FIG. 5A, the EVOP subroutine begins with an instruction, F200, for reading and storing the present values for each of the load and fuel assignments, it being noted that these values will be used for various purposes throughout this routine as for instance, to compare the newly calculated values to and, to revert back to if the new values do not provide a significant advantage over the existing values. After storing this information, this routine proceeds to check the status of the auto/manual transfer elements, F201. It will be noted that if an auto/manual transfer element (not shown) for the boiler master bias station (not shown) is in manual, both combustion control loops are considered to be in manual.

Following verification of the status of the auto/manual transfer elements, this routine then inquires whether each boiler is maintaining a load above a predetermined value, F202. If the load of that boiler is less than or equal to this value, the boiler is considered out of service and a boiler out of service flag is set for future reference, F203. If it is determined that this boiler is in service, the routine will execute a next inquiry as to whether the particular fuel is available, F204. This inquiry is made based on a determination that the fuel valves of that fuel are open and if they are not, then it is known that the fuel is unavailable and a fuel unavailable flag is set for future use, F204a. If the response to the inquiry on the availability of the fuel is positive, this routine proceeds to the next instruction where the change in steam load since the last run of the EVOP subroutine, is determined, F205. This determined steam load value is that value which is represented in columns 1 and 2 of data segment IV shown in FIG. 4.

After determining the steam load, the EVOP subroutine then executes an instruction F206 wherein the previous output data and setpoint values are initialized to default values to be used in the event of an error in the execution of the EVOP procedure.

A further precaution taken before the actual execution of the EVOP routine is run, is illustrated in instruction F207. This instruction executes a return to the main instruction loop if there are less than two fuels in the automatic mode, or if the total steam load exceeds the system capacity. If one of these conditions is prevalent, then the setpoints are fixed at the present values and the EVOP subroutine is exited.

Following the execution of instruction F207, it is now permissible to perform the EVOP experimental design and to begin this operation, the EVOP counter is reset to zero, F208. Instruction F209 illustrates that the upper and lower limits for the boiler loads and fuels are first estimated, these values pertaining to information contained in data segment II shown in FIG. 3. The EVOP subroutine then sets the limit on any particular variable to the present value and the value of the perturbation to 0.0 if the auto/manual transfer element associated with that variable is in the manual mode, F210.

Following a setting of values based on the status of the auto/manual transfer elements, the next instruction F211, looks at the boiler out of service flag and the fuel unavailable flag and sets the variables associated therewith to 0.0 and the perturbation value to 0.0. It will be noted that under these conditions, the values are not given the present values but are in fact set to zero to totally remove them from the optimization calculation.

Both the maximum and minimum limits for the boiler load variables are read from RAM if the boiler load is in the automatic mode, this operation occurring in instruction F212 and corresponding to the values in lines 4 and 5 of data segment II shown in FIG. 3. If a particular fuel is in the automatic mode, a value for the maximum flow of that fuel is taken from RAM as shown in instruction F213 and the upper constraint for that value is determined as a function of the number of burners on for that fuel, F214. To determine the lower fuel flow constraint, instruction F215 illustrates that this value is determined as a function of the calculated upper limit and the fuel turndown ratio.

The EVOP subroutine next examines whether the fuel BTU ratio is in manual or automatic and if in manual then sets the fuel perturbation value for that boiler to 0.0, F216. If the fuel BTU ratio is in the manual mode, only the boiler load may be optimized. As previously discussed, the fuel BTU ratio provides one of the means by which the EVOP experimental design can be efficiently utilized on a six variable operation by allowing the determination of the optimal assignments for a second fuel based on a optimized value of the first fuel. When the fuel BTU ratio is in the automatic mode though, the fuel for that boiler can be given a perturbation value and the EVOP procedure can be run. It should be now noted that the variables for performing the EVOP procedure are all in place and that the above instructions were carried out for each of the variables for each of the boilers so that data segments I through III of FIG. 3 are all filled in whether those variables have actual perturbation values assigned or have perturbation values set to zero as in the case where that variable is in the manual mode.

The EVOP subroutine next executes the actual EVOP procedure in accordance with the techniques previously discussed with respect to data segment IV shown in FIG. 3, this operation being shown as instruction F217. Instruction F217*a* illustrates that the remaining variables which were not per turbed, are estimated as discussed previously with respect to the INDX row of data segment III shown in FIG. 3. Upon completing the first set of test cases, the EVOP routine then asks if the costs associated with at least one set of TEST values is better than the starting costs, F218, and if not, the EVOP routine proceeds to reuse the previous values, F219. If there is a cost improvement noted in the first run of test cases, the routine continues with the EVOP procedure until a convergence is reached, F220. The EVOP procedure under instruction F220 is a decisional instruction that asks whether the best cost test case is convergent; that is, whether the improvement over the last best cost test case is negligible. If convergence has occurred, the next instruction F221 is executed. These optimum values are then stored in the REF array and the EVOP subroutine is exited, F224 and control is returned to the main instruction loop at instruction F108 as shown in FIG. 4.

Throughout the discussion of the operation of the economical despatching arrangement for a dual boiler cogenerative type steam generating plant, reference has been made to various sets and types of data. The attached Appendix A is intended to identify this data in organizational terms along the following lines:

Section 1.1: Data received over the communication links;

Section 1.2: Data calculated within the computer system;

Section 1.3: Manually inserted data; and,

Section 1.4: Data internal to the EVOP subroutine.

It will also be noted that, under section 1.3, the manually inserted data is further organized along lines of the data related to the EVOP routine and data related to the boilers and fuels.

Although the hereinabove described embodiment constitutes a preferred embodiment of the invention, it can be appreciated that modifications can be made thereto without departing from the scope of the claims as detailed in the appended claims. As an example, it should be understood that this invention can be applied to larger plants which consist of many boiler houses each containing multiple boilers which can be fired with multiple fuels. In this situation, a linear programming technique may be used to assign an optimal fuel and load distribution to each boiler house. A second linear program matrix could then be used to determine a sub-optimal fuel and load distribution within each boiler house. Finally, the enhanced EVOP arrangement of applicants' invention could be utilized to optimize the load and fuel distribution among those boilers which are not already at or close to their operating constraints.

APPENDIX A

| | | |
|---|---|---|
| 1.0 | DATA ORGANIZATION | |
| 1.1 | Data Received Over Communication Lines | |
| | STEAM(1) Steam flow from Boiler #1 | lb/h |
| | STEAM(2) Steam flow from Boiler #2 | lb/h |
| | FFLOW(1) Natural gas flow to Boiler #1 | scfh |
| | FFLOW(2) Natural gas flow to boiler #2 | scfh |
| | FFLOW(3) Fuel oil flow to Boiler #1 | lb/h |
| | FFLOW(4) Fuel oil flow to boiler #2 | lb/h |
| | Auto/Manual Status | |
| | LDSTAT(1) Master - Boiler #1 | |

APPENDIX A-continued

| | | | |
|---|---|---|---|
| | LDSTAT(2) Master - Boiler #2 | | |
| | FLSTAT(1) Gas flow control loop - Boiler #1 | | |
| | FLSTAT(2) Gas flow control loop - Boiler #2 | | |
| | FLSTAT(3) Oil flow control loop - Boiler #1 | | |
| | FLSTAT(4) Oil flow control loop - Boiler #2 | | |
| 1.2 | Data Calculated Within Computer System | | |
| | Steam Related | | |
| | HACQ(1) Net heat acquired by steam - Blr. #1 - BTU/lb | | |
| | HACQ(2) Net heat acquired by steam - Blr. #2 - BTU/lb | | |
| | Fuel Related | | |
| | O(4,3,2) Oil Efficiency vs. Load Regression Coefficients - Boilers #1 and #2 | | |
| | G(4,3,2) Gas Efficiency vs. Load Regression Coefficients - Boilers #1 and #2 | | |
| Note: | The dimensions of both of these arrays may be defined as X(COEF,RANGE,BOILER). These coefficients are updated by the regression efficiency program once per hour. See documentation on BLRREGR. | | |
| 1.3 | Manually Inserted Data | | |
| 3.3.1 | Arrays Related to EVOP Subroutine | | |
| FUEL | The identity of the fuel in the corresponding column of the EVOP array A(5,7). 1 = Oil 2 = Gas Note that FUEL(1) and FUEL(2) have been assigned a value of 2, indicating that gas is the dependent fuel on each boiler. | | |
| KBLR | Index of the boiler associated with each column variable in A(5,7) | | |
| RNGE | Starting loads (Mlb/h) for each of the three piecewise polynomials which relate combustion efficiency to load. Used also by the regression program. | | |
| DEL | Starting perturbation values for variables $V_1$ through $V_3$. | | |
| INDX | Index indicating order in which variables are assigned non-zero multipliers to their associated values of $DEL_i$. (See page 2 above for discussion on the relationship between the values of the multipliers and test number.) Thus, changing this order allows $V_2$ (i.e. STEAM(2)) rather than $V_3$ (i.e. oil flow to boiler #2 FFLOW(4)) to have three times its initial value of $DEL_i$ in test #4. Some control over sensitivity of convergence can thus be obtained by appropriate assignment of this sequence. | | |
| 3.3.2 | Data Related to Boilers and Fuels | | |
| PRICE(1) | Price of fuel oil | $/Million BTU | DPU |
| PRICE(2) | Price of natural gas | $/Million BTU | DPU |
| HV(1) | Heating value of oil | BTU/lb | DPU |
| HV(2) | Heating value of natural gas | BTU/scf | DPU |
| NFUEL | Number of fuels per boiler | | DPU |
| MAXF | Maximum allowable flows of fuels to each boiler | | DPU |
| MINF | Minimum allowable flows of fuels to each boiler | | DPU |
| NBLR | Number of boilers in the system | | DPU |
| MAXL | Maximum load on boilers | lb/h | DPU |
| MINL | Minimum allowable load on boilers | lb/h | |
| | Note that MAXL, MAXF and MINF could change with the number of burners in operation. | | |
| 1.4 | Data Internal to EVOP Subroutine | | |
| A(5,7) | Main EVOP working array | | |
| WDEL | Working value of $DEL_i$, made initially equal to $DEL_i$ being subsequently reduced in the search for a better optimum solution. | | |
| WMAX | Working maximum value of associated column variable | | |
| WMIN | Working minimum value of associated column variable | | |
| COST | Cost of each fuel ($/lb or $/scf) | | |
| EFFF | Efficiency of each fuel on each boiler | | |
| RESP | Cost of each test in the SSDEVOP set | | |
| TOT | New base set after evaluating the responses to a set of EVOP tests | | |
| REF | Set of values from best past test | | |

We claim:

1. An arrangement for economically despatching fuel and load assignments on a multi-boiler cogenerative type steam generating plant, said economical despatching arrangement capable of firing each boiler with at least two fuels and of allocating shares of a total steam load among the boilers, said economical despatching arrangement comprising:

means for determining a present value of the flow of each fuel to each of said boilers and storing each determined value; of means for determining present values of said shares said total steam load allocated among said boilers which store a respective said determined share associated therewith; for each means for calculating an optimal next value of said fuel and load assignments as a function of said present fuel flow values and present share values;

said calculating means including a means for estimating a proportionate share value on one of said boilers and a fuel flow value for one of said at least two fuels, said calculating means, by use of said estimating means, calculates said optimal next values for each of said fuel and load assignments using a quantity of variables reduced in number relative to the quantity of said fuel and load assignments; and, means for implementing at least one of said optimal next values into said multi-boiler cogenerative type steam generating plant in one of an automatic and a manual mode of operation.

2. An economical despatching arrangement as set forth in claim 1 further comprising a means for displaying said optimal next values, said displaying means cooperatively engaging said implementing means such that said optimal next values can be individually presented in at least one of a form of suggestion, an indication of automatic implementation, and a combination of both of said suggestion form and implementation indication.

3. An economical despatching arrangement as set forth in claim 1 wherein said calculating means calculates at least one of said optimal next values based on periodically updated values representing a cost efficiency of each of said fuels with respect to the steam load being generated thereby, said calculating means further calculating said optimal next values based on said cost efficiency value of each of said fuels, a known cost factor for each of said fuels, and a known heating value associated with each of said fuels.

4. An economical despatching arrangement as set forth in claim 1 wherein said estimating means estimates an optimal next value for said steam load share for one of said boilers by subtracting a summation of the calculated optimal next values of steam load share for the remaining of said boilers from the known value for the total steam load to be supplied by said steam generating plant.

5. An economical despatching arrangement as set forth in claim 1 wherein said estimating means estimates an optimal next value for one of said at least two fuels based on a calculated fuel ratio between said at least two fuels and said calculated optimal next values for said fuel flow.

6. An economical despatching arrangement as set forth in claim 1 further comprising a means for detecting the availability of each of said at least two fuels and disabling the operation of said calculating means with respect to calculating an optimal next value for any of said at least two fuels that have been determined to be unavailable.

7. An economical despatching arrangement as set forth in claim 1 further comprising a means for detecting that one of said boilers is out of service and for disabling said calculating means with respect to an optimal next value for said any of said proportionate share values associated with said boilers when it has been determined that any of said boilers is out of service.

8. An economical despatching arrangement as set forth in claim 1 further comprising a means for indicating that said present values of fuel flow and steam load have been updated according to the latest operating conditions of said steam generating plant and for preventing operation of said calculating means if said indicating means indicates an absence of updated present values of said fuel flow and steam load.

9. An economical despatching arrangement as set forth in claim 1 further comprising timing means for storing a first count value representative of a first count of program operations that have been executed since the last operation of said calculating means and for initiating a new operation of said calculating means if said first count exceeds a preselected value and a condition exists whereby at least one of a change in equipment status associated with said steam generating plant has occurred and a change in said total steam load has been requested; said timing means further storing a second count value representative of a second count of program operations that have been executed since the last operation of said calculating means and further effective for initiating said new operation of said calculating means if said second count exceeds a second preselected value independent of the presence of said change in equipment status and change in steam load conditions.

10. An economical despatching arrangement as set forth in claim 1 wherein said calculating means calculates said optimal next values by first setting said present values of fuel flow and steam load share as a base set of variables and generating a plurality of test cases for said set of variables, said plurality of test cases each containing a combination of said set of variables some of which are perturbed about said base set of variables by a predetermined magnitude and in a predetermined pattern, said calculating means further determining response values for each of said test cases and identifying a worst case response and a best case response from among said plurality of test cases and for subtracting said test case associated with said worst response from twice the mean value of the remaining test cases thereby resulting in a new set of variables on which said calculating means repeats said generation of said plurality of test cases, said determination of responses, and said subtraction of said test case associated with said worst response until such time as a change in values associated with said best response falls below a preselected value.

11. An, economical despatching arrangement as set forth in claim 10 wherein said magnitude of said perturbation value decreases for each successive operation of said calculating, means.

12. An economical despatching arrangement as set forth in claim 1 further comprising a means for preventing implementation of at least one of said optimal next values and reusing said stored present values of a corresponding at least one of said fuel flows and shares of steam load upon sensing that said at least one of said optimal next values exceeds a predetermined limit.

13. An economical despatching arrangement as set forth in claim 3 wherein said, preventing means s further prevents implementation of at least one of said optimal next values when said implementing means indicates that a manual operation has been selected for said at least one of said optimal next values.

14. An economical despatching arrangement as set forth in claim 12 .wherein said preventing means is further effective for preventing implementation of said optimal next values unless the cost improvement associated with said optimal next values exceeds a predetermined threshold value which is substantially higher than said present values of fuel flow and steam load.

* * * * *